US009302295B2

(12) United States Patent
Miette

(10) Patent No.: US 9,302,295 B2
(45) Date of Patent: Apr. 5, 2016

(54) METHOD OF SORTING MAILPIECES WITH RECIPIENT SORTING

(71) Applicant: Solystic, Gentilly (FR)

(72) Inventor: Emmanuel Miette, Saint-Gratien (FR)

(73) Assignee: Solystic, Gentilly (FR)

( * ) Notice: Subject to any disclaimer, the term of this patent is extended or adjusted under 35 U.S.C. 154(b) by 286 days.

(21) Appl. No.: 13/981,257

(22) PCT Filed: Nov. 26, 2012

(86) PCT No.: PCT/FR2012/052721
§ 371 (c)(1),
(2) Date: Jul. 23, 2013

(87) PCT Pub. No.: WO2013/117826
PCT Pub. Date: Aug. 15, 2013

(65) Prior Publication Data
US 2014/0072167 A1 Mar. 13, 2014

(30) Foreign Application Priority Data
Feb. 9, 2012 (FR) .................................... 12 51199

(51) Int. Cl.
*G06K 9/00* (2006.01)
*B07C 3/18* (2006.01)
*B07C 3/00* (2006.01)

(52) U.S. Cl.
CPC ..... *B07C 3/18* (2013.01); *B07C 3/00* (2013.01); *G06K 9/00536* (2013.01)

(58) Field of Classification Search
None
See application file for complete search history.

(56) References Cited

U.S. PATENT DOCUMENTS

| 2003/0072469 A1 | 4/2003 | Alden | |
| 2004/0178128 A1* | 9/2004 | O'Connell et al. | 209/584 |
| 2006/0122858 A1* | 6/2006 | Miles et al. | 705/1 |
| 2006/0167877 A1* | 7/2006 | Lee et al. | 707/7 |

(Continued)

FOREIGN PATENT DOCUMENTS

EP 1835444 A1 9/2007

OTHER PUBLICATIONS
International Search Report; PCT/FR2012/052721; Mar. 27, 2013.
(Continued)

*Primary Examiner* — Vikkram Bali
*Assistant Examiner* — Tracy Mangialaschi
(74) *Attorney, Agent, or Firm* — Patterson & Sheridan, LLP

(57) ABSTRACT

A method of sorting mailpieces, in which the mailpieces are sorted automatically in a sorting system with a view to being delivered to a recipient by a mail carrier, and are fed back into a sorting machine for additional sorting in order to re-sequence the mailpieces in a certain classification established by the recipient. This method is characterized by the following steps:

the sorting system transmitting to the recipient digital images corresponding to respective ones of the mailpieces to be delivered to said recipient, these digital images being associated in the transmission with the unique mailpiece identifiers (Id tags) generated by the sorting system, with a view to said unique mailpiece identifiers being reorganized relative to one another by the recipient into an order that defines said classification; and controlling the sorting machine so that it performs the additional sorting of said mailpieces on the basis of said unique mailpiece identifiers as reorganized into said classification established by the recipient.

5 Claims, 1 Drawing Sheet

(56) References Cited

U.S. PATENT DOCUMENTS

2008/0158615 A1 7/2008 Parkos et al.
2009/0084713 A1 4/2009 Miller et al.
2010/0049536 A1* 2/2010 Quine et al. ..................... 705/1

OTHER PUBLICATIONS

Search Report (INPI, French Patent Office); FR 1251199; Oct. 4, 2012.

* cited by examiner

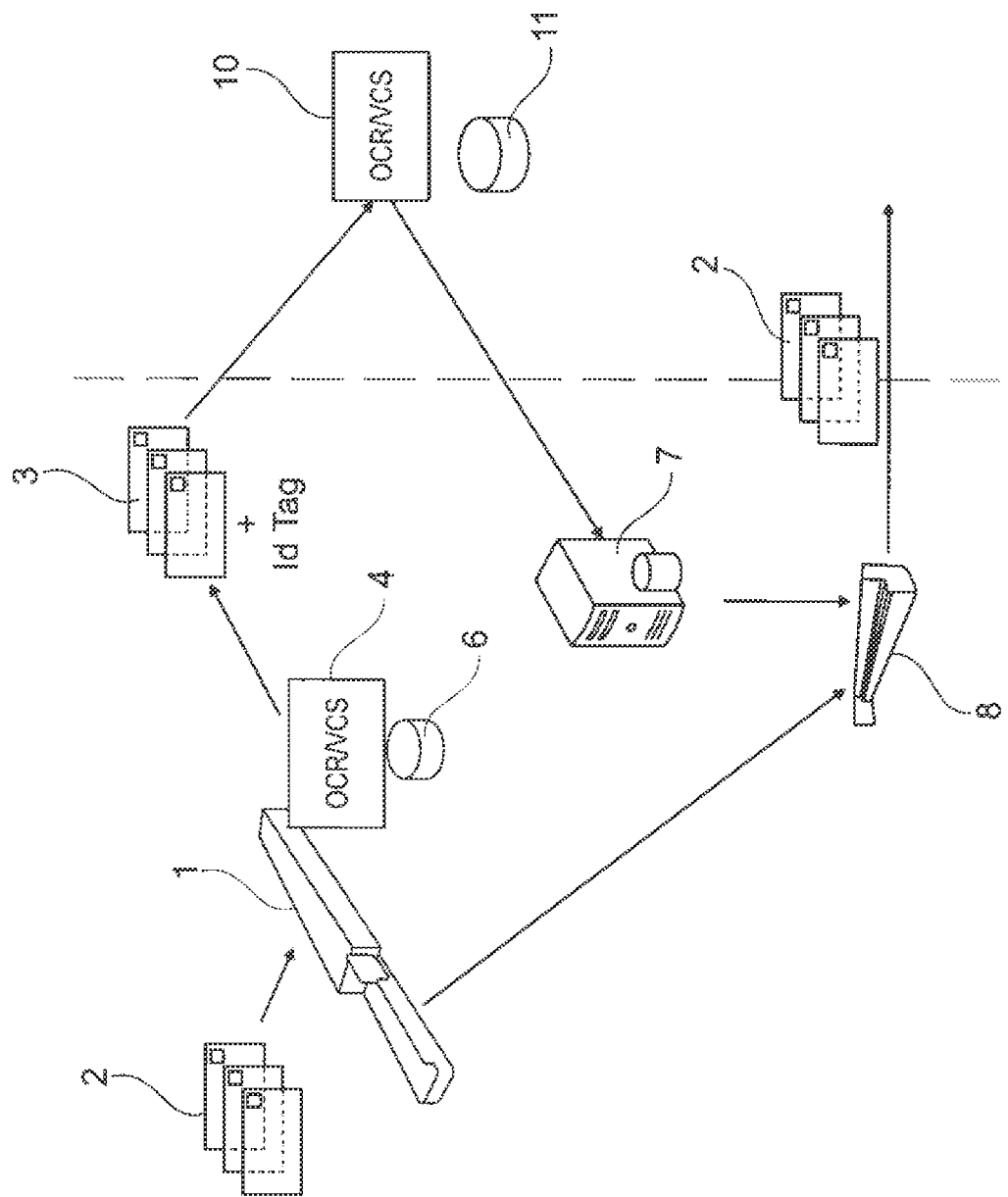

METHOD OF SORTING MAILPIECES WITH RECIPIENT SORTING

TECHNICAL FIELD

The field of the invention is the field of postal sorting, in particular the field of automatically sorting mailpieces, it being possible for said mailpieces to be letters, magazines or newspapers wrapped in plastic or in paper, and in general large-format or small-format flat articles, or indeed parcels.

The invention relates more particularly to a method of sorting mail, with recipient sorting of the mail, i.e. with in-depth sorting on the basis of recipient-specific delivery points.

PRIOR ART

Automatically sorting the mail of a corporation or organization having a large number of staff raises the problem that the Post Office or Postal Authority (Postal Operator in the broadest sense) delivering the mail is not aware of the sorting criteria internal to the corporation or to the organization.

Certain Postal Authorities propose to mail issuers to identify some particular department of the recipient by adding an additional sorting code in addition to the delivery postal address and referred to as a "TSA" code by the French Post Office, for "Tri Service Arrivée" (Sorting Service on Arrival).

The TSA code is a five-digit code in France that corresponds to a subdivision of the recipient of the mail. The postal Operator may thus have its sorting machines sort more finely the mail addressed to a recipient having a TSA code. But such a solution is actually suitable only for very large organizations that change very rarely and that thus have TSA codes that remain stable over time.

SUMMARY OF THE INVENTION

An object of the invention is to provide a method of sorting mail with recipient sorting that does not use an additional recipient sorting code placed on the mailpieces so that it is more suitable for smaller or open-ended corporate structures or organization structures. Another object of the invention is to propose such a method that can enable the Postal Operator to sort as a function of a specific person or of a specific department on the site of the recipient of the mailpieces without the Postal Operator having accurate knowledge of the corporate structure of said recipient at any given time. Yet another object of the invention is to provide such a method that is independent of changes in structure of the recipient.

The basic idea of the invention is for the recipient sorting to be proposed as a service to which a recipient subscribes with a Postal Operator. When a batch of sorted mailpieces is ready to be delivered by the mail carrier to the site of a recipient who has subscribed to the service, digital images of said mailpieces are sent to the recipient, who can arrange said digital images visually, e.g. in a determined order that defines the recipient's current internal classification.

The invention thus provides a method of sorting mailpieces, in which the mailpieces are sorted automatically in a sorting system with a view to being delivered to a recipient by a mail carrier, and are fed back into a sorting machine for additional sorting in order to re-sequence the mailpieces in a certain classification established by the recipient, said method being characterized by the following steps:

the sorting system transmitting to the recipient digital images corresponding to respective ones of the mailpieces to be delivered to said recipient, these digital images being associated in the transmission with the unique mailpiece identifiers generated by the sorting system, with a view to said unique mailpiece identifiers being reorganized relative to one another by the recipient into an order that defines said classification; and controlling the sorting machine so that it performs the additional sorting of said mailpieces on the basis of said unique mailpiece identifiers as reorganized into said classification established by the recipient.

The method of the invention may have the following features:

the unique mailpiece identifiers are re-sequenced by making use of displaying the digital images of the mailpieces in a video coding station;

the unique mailpiece identifiers are re-sequenced by making use of displaying the digital images of the mailpieces via an optical character recognition (OCR) automatic recognition system;

in the video coding system, each digital image of a mailpiece is associated with a sorting code corresponding to a delivery point of the recipient; and the digital images of the mailpieces are transmitted via a communications network, e.g. the Internet.

In practice, it can be understood that a Postal Authority can send an electronic file containing digital images of mailpieces to a mailpiece recipient who subscribes to such an additional sorting service, each image being associated with a unique mailpiece identifier in the file. On a video coding station or the like making it possible to display digital images one after another, the recipient can view them in the initial order of transmission and thus re-sequence them in a result file in order to take into account the recipient's delivery needs. The unique mailpiece identifiers are therefore also re-sequenced like the digital images in the result file, and, on the basis of said result file, a sorting machine can be controlled to perform the additional sorting of the recipient's mailpieces so as to sequence them in the same order as the unique mailpiece identifiers, which order is defined in said result file. It can thus be understood that the order of the unique mailpiece identifiers may be reorganized in different manners, while the digital images of the mailpieces serve to facilitate reorganization in visual manner.

BRIEF DESCRIPTION OF THE DRAWING

An implementation of the method of the invention is described below in more detail and is shown in the sole FIGURE.

DESCRIPTION OF THE IMPLEMENTATIONS

The FIGURE shows a sorting system of a Postal Operator (a Post Office or Postal Authority) with a sorting machine 1 that is, for example, adapted to sort letters and to prepare delivery rounds in its sorting outlets.

A batch of sorted mailpieces 2 is shown in which the mailpieces have been sorted for a recipient who has subscribed to an additional per-recipient sorting service provided by the Postal Authority. With this subscription, taken out through an Internet portal or via a messaging system, the recipient can consult the list of the mailpieces 2 that are ready for being delivered to said recipient by the mail carrier. The recipient corresponds to the right portion of the FIGURE.

This communications interface is also arranged to enable the recipient to retrieve, through a data transmission channel such as the Internet or the like, the digital images 3 of the mailpieces 2 waiting to be delivered, which images are associated with the unique mailpiece identifiers that are represented by the reference "Id tags". It should be understood that these digital images 3 of mailpieces are the images that were formed in the sorting machine 1 by the system 4 for automatically reading postal addresses by OCR or by video coding (using a video coding system (VCS)) for recognizing a delivery postal address with a postal address database 6 being used.

Each digital image 3 is associated with a unique mailpiece identifier Id tag that is the identifier that is also generated during the machine sorting by the sorting machine 1.

In practice, the mailpiece images 3 in respective association with the unique mailpiece identifiers Id tags corresponding to the mailpieces 2 for the recipient are transmitted from the sorting system of the Postal Authority to a computer of the recipient in an electronic file. The order of the digital images 3 in the file may be the same as the order of the mailpieces 2 in the sorting outlet of the machine 1.

The recipient receives this file and can then reorganize the order of these digital images 3 and thus of the unique mailpiece identifiers Id tags, e.g. by means of video coding station 10 with a display screen.

The recipient scrolls through the digital images 3 one-by-one on the display screen and can assign to each digital image 3 a sorting code that corresponds to a delivery point on the recipient's site. The various sorting codes assigned by the recipient to the digital images 3 thus define partitioning of the digital images 3 into various groups that correspond to the classification of the mailpieces 2 per specific recipient or per specific department on the recipient's site.

In a variant, the additional sorting codes may be assigned to the digital images 3 automatically via a system for automatically recognizing by OCR the address information in each digital image 3, which system uses a database 11 describing the corporate structure specific to the recipient.

The unique mailpiece identifiers Id-Tags sequenced by additional sorting codes may be retrieved from another electronic file that can be transmitted to the Postal Authority by the recipient via the Internet or the like, it being possible for this file to be received at a data-processing, monitoring and control unit 7 that drives a sorting machine 8 on the site of the Postal Authority.

The mailpieces 2 for the recipient can thus be fed into the inlet of the sorting machine 8, and the unit 7 can use the file resulting from the sequenced identifiers to control the sorting machine 8 in such a manner as to perform additional sorting of the mailpieces 2 in compliance with the classification requested by the recipient. The mailpieces 2 sorted at the outlet of the sorting machine 8 can then be delivered to the recipient's site.

In principle, the mailpieces 2 sorted at the outlet of the sorting machine 8 are presented one after another but in groups as a function of the recipient's classification. In order to facilitate delivery of the groups of mailpieces 2 on the recipient's site, separators may be fed through the sorting machine 8 for the purpose of visually marking the start and the end of each group of mailpieces 2.

The invention claimed is:

1. A method for sorting postal mailpieces in a sorting machine with sorting outlets comprising the steps of:
    sorting said mailpieces into said sorting outlets for providing a batch of sorted mailpieces intended for a recipient;
    imaging said sorting mailpieces of said batch and associating each digital image with a unique mailpiece identifier generated by the sorting machine;
    transmitting said digital images and unique mailpiece identifiers of said batch of mailpieces in a certain organized order from the sorting machine to the recipient;
    receiving said unique mailpiece identifiers of said batch of mailpieces in a reorganized order from the recipient to the sorting machine;
    feeding said sorting machine with said batch of sorted mailpieces;
    sorting said batch of mailpieces according to the corresponding reorganized order of unique mailpiece identifiers into said sorting outlets.

2. The method according to claim 1, in which the unique mailpiece identifiers (Id tags) are re-sequenced by making use of displaying the digital images of the mailpieces in a video coding station.

3. The method according to claim 2, in which, in the video coding system, each digital image of a mailpiece is associated with a sorting code corresponding to a delivery point of the recipient.

4. The method according to claim 1, in which the unique mailpiece identifiers are re-sequenced by making use of displaying the digital images of the mailpieces via an OCR automatic recognition system.

5. The method according to claim 1, in which the digital images of the mailpieces are transmitted via a communications network, e.g. the Internet.

* * * * *